(12) United States Patent
Fraser

(10) Patent No.: US 6,947,732 B2
(45) Date of Patent: Sep. 20, 2005

(54) METHOD AND SYSTEM FOR COMMUNICATING WITH A VEHICLE IN A MIXED COMMUNICATION SERVICE ENVIRONMENT

(75) Inventor: Ronald W. Fraser, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 457 days.

(21) Appl. No.: 10/173,898

(22) Filed: Jun. 18, 2002

(65) Prior Publication Data

US 2003/0232619 A1 Dec. 18, 2003

(51) Int. Cl.[7] ............................ H04Q 7/20; G08C 17/00
(52) U.S. Cl. .................. 455/420; 455/574; 455/343.4; 455/345; 455/552.1; 455/553.1; 455/575.4; 370/395.4; 370/311
(58) Field of Search .............................. 455/420, 575.9, 455/574, 344, 345, 552.1, 553.1, 418, 419, 343.4; 370/311, 395.4

(56) References Cited

U.S. PATENT DOCUMENTS

| | | | | |
|---|---|---|---|---|
| 4,698,748 A | * | 10/1987 | Juzswik et al. ............. 713/322 |
| 5,594,776 A | * | 1/1997 | Dent ........................... 455/458 |
| 5,752,202 A | * | 5/1998 | Obright ....................... 455/574 |
| 6,028,537 A | * | 2/2000 | Suman et al. ............... 340/988 |
| 6,073,035 A | * | 6/2000 | Witter ......................... 455/574 |
| 6,721,289 B1 | * | 4/2004 | O'Toole et al. ............. 370/311 |

* cited by examiner

Primary Examiner—Sonny Trinh
Assistant Examiner—Huy Phan
(74) Attorney, Agent, or Firm—Anthony Luke Simon

(57) ABSTRACT

The present invention provides a method of accessing a mobile vehicle using a wireless communication system. A vehicle communication device is placed into a first communication service sleep mode of a sleep cycle. It is determined if a first communication service is currently available to the vehicle communication device. If the first communication service is available, the vehicle communication device remains in a first communication service awake mode for a first interval of the sleep cycle. If the first communication service is not available, the vehicle communication device remains in the first communication service sleep mode for the first interval of the sleep cycle. Programs and systems of using the method are also provided.

28 Claims, 3 Drawing Sheets

METHOD AND SYSTEM FOR COMMUNICATING WITH A VEHICLE IN A MIXED COMMUNICATION SERVICE ENVIRONMENT

FIELD OF THE INVENTION

This invention relates generally to data transmission over a wireless communication system. More specifically, the invention relates to a method and system for communicating with a powered-down mobile vehicle in a mixed communication service environment, such as one in which both digital and analog services are available.

BACKGROUND OF THE INVENTION

Wireless communication services for mobile vehicles, such as navigation and roadside assistance, have increased rapidly in recent years. Most of the services that have been offered are for a mobile vehicle in operation, but more recently, the demands and potential for services to a turned-off vehicle have grown. Services that may be requested while the vehicle is off or in a quiescent mode may include maintenance and diagnostic functions, system updates, vehicle position determination, unlocking of the doors, or vehicle alarm silencing.

Normally when the mobile vehicle is off, it is placed into a powered-down discontinuous-receive (DRx) cycle. A communication device and a telematics unit on or in communication with each other and with the vehicle may also be placed into a similar DRx cycle to minimize power drain on the battery. To perform a requested function while the ignition is off, the vehicle may be awakened, the desired function performed, and the vehicle subsequently placed back into the DRx cycle.

One method currently in use is to synchronize the wake-up time of the DRx cycle with an incoming call from a telematics or service call center. When the vehicle is awakened, a call may be received and responded to appropriately. The time period between wake-up operations may vary from ten minutes to several days or more if the vehicle has not been moved or driven. To coordinate the wake-up function with the call from the call center, the time at the call center may need to be synchronized with time at the mobile vehicle. A global positioning system (GPS) unit in the mobile vehicle may provide an accurate reading of time. After the call is received and the vehicle responds, the vehicle may be put back into the DRx cycle again after a predetermined duration, minimizing battery drain. The DRx cycle may comprise, for example, awake durations, during which the vehicle may communicate with the call center and sleep durations, during which the vehicle is asleep but capable of being awakened. This DRx cycle may last for a set amount of time.

Unfortunately, a prescribed, coordinated DRx cycle with prescribed sleep interval duration and a prescribed wake-up schedule may not always accommodate the needs of the user or service subscriber. For example, a vehicle in long-term parking at an airport may have been turned off for a period which exceeds the time period allotted for its DRx cycle (e.g., the vehicle has been set to use cycle for three days and the vehicle is left turned off for four days). This becomes a difficulty when the subscriber, upon arriving at his vehicle, requires immediate telematic assistance (e.g., on day four, the subscriber returns to find the keys have been locked in the vehicle and requires telematic assistance to unlock the vehicle.) In another example, a vehicle may enter the DRx cycle too soon (e.g., the vehicle is set to enter cycle as soon as the ignition goes off). This becomes a difficulty when the subscriber, upon turning off the vehicle discovers he needs telematic assistance and must wait until the DRx cycle goes from a sleep interval into a wakeup interval before requesting the assistance.

In addition, when a vehicle awakens, it may be required to register with a local wireless carrier before sending or receiving a call. In certain instances, the time required for responding to a service request or receiving communication, service or software updates for the vehicle and the communication requirements may extend beyond the predetermined awakened duration. In other situations, a call may not be able to be completed during the awakened period due to high call loads on the call center or wireless service provider. Therefore, it may be beneficial to be able to alter wakeup duration and period between wake-ups, accommodating the actual or anticipated requests.

A method is needed to make vehicle services more available even when the vehicle is powered down or turned off. This would result in increased subscriber satisfaction with the services. Increased availability of services is generally compromised by the need to maintain low power consumption.

An improved method may also ease the strain on the call center, for example, by avoiding the need for multiple call attempts to a vehicle during a wake-up period or by allowing the call attempt pattern for contacting numerous vehicles to be staggered or altered. An improved method would further allow an extension of time for the vehicle to complete the requested service during the wake-up period, and an alteration of the predetermined time for initiating the wake-up period. One desirable method improves the availability of a vehicle to receive and perform a service request, while maintaining low power consumption.

Co-pending U.S. patent application Ser. No. 10/011,689 entitled "Method and System for Communication With a Quiescent Mobile Vehicle" by Ronald W. Fraser et al. describes one method of placing the vehicle in a discontinuous receive (DRx) mode, e.g., a mode in which the vehicle can remain in a low-current state for as much time as possible while the vehicle's ignition is off, while occasionally entering an "awake" state for receiving services if necessary. Currently this process of discontinuous receive is accomplished with analog cellular hardware. Analog hardware may limit the amount of time that a vehicle unit can remain awake during an "awake" period.

A method is needed therefore to improve current drain over the analog technology by taking advantage of digital cellular and PCS technology. A method is also needed to enable a vehicle to maintain a DRx cycle in a mixed communication service environment, such as one in which both digital and analog services are available.

It is an object of this invention, therefore, to provide a method for improving the availability of a quiescent vehicle to receive and perform a service request, and to overcome the deficiencies and obstacles described above.

SUMMARY OF THE INVENTION

One aspect of the present invention provides a method of accessing a mobile vehicle using a wireless communication system. A vehicle communication device is placed into a first communication service sleep mode of a sleep cycle. It is determined if a first communication service is available to the vehicle communication device. If the first communication service is available, the vehicle communication device remains in a first communication service awake mode for a first interval of the sleep cycle. If the first communication service is not available, the vehicle communication device remains in the first communication service sleep mode for the first interval of the sleep cycle.

It may also be determined if a second communication service is currently available to the vehicle communication device and the second communication service may be selected. Alternatively, it may be re-determined if the first communication service is available, and if it is not available the vehicle communication device may remain in a second communication service awake mode for a second interval of the sleep cycle. The vehicle communication device may also return to the first communication service sleep mode after the first interval of the sleep cycle has elapsed. It may also be determined if the sleep cycle is ended and, if the sleep cycle is ended, the vehicle communication device may be turned off.

It may further be determined if the first interval of the sleep cycle is a continuous interval. It the first interval is continuous, the vehicle communication device may remain in the first communication service awake mode until the sleep cycle is ended. Once the sleep cycle is ended, the vehicle communication device may be turned off. If the first interval is not continuous, the vehicle communication device may return to the first communication service sleep mode after the first interval of the sleep cycle has elapsed. The first communication service may be a digital service while the second communication service may be an analog service.

Another aspect of the present invention provides computer program product in a computer usable medium for accessing a mobile vehicle using a wireless communication system. Yet another aspect of the present invention provides a mobile vehicle access system.

The product and system of the present invention may include means for placing a vehicle communication device into a first communication service sleep mode of a sleep cycle and means for determining if a first communication service is currently available to the vehicle communication device. If the first communication service is available, the product and system may include means for remaining in a first communication service awake mode for a first interval of the sleep cycle; and if the first communication service is not available, the product and system may include means for remaining in the first communication service sleep mode for the first interval of the sleep cycle.

The product and system of the present invention may also include means for determining if a second communication service is currently available to the vehicle communication device and means for selecting the second communication service. The product and system may also include means for re-determining if the first communication service is available and, if the first communication service is not available, means for remaining in a second communication service awake mode for a second interval of the sleep cycle. The product and system may also include means for returning to the first communication service sleep mode after the first interval of the sleep cycle has elapsed.

In addition, the product and system of the present invention may provide means for determining if the sleep cycle is ended as well as means for turning the vehicle communication device off once the sleep cycle has ended.

The product and system of the present invention may further include means for determining if the first interval of the sleep cycle is a continuous interval. If the first interval of the sleep cycle is continuous, the product and system may provide means for remaining in the first communication service awake mode until the sleep cycle is ended. If the first interval of the sleep cycle is not continuous, the product and system may provide means for returning to the first communication service sleep mode after the first interval of the sleep cycle has elapsed.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
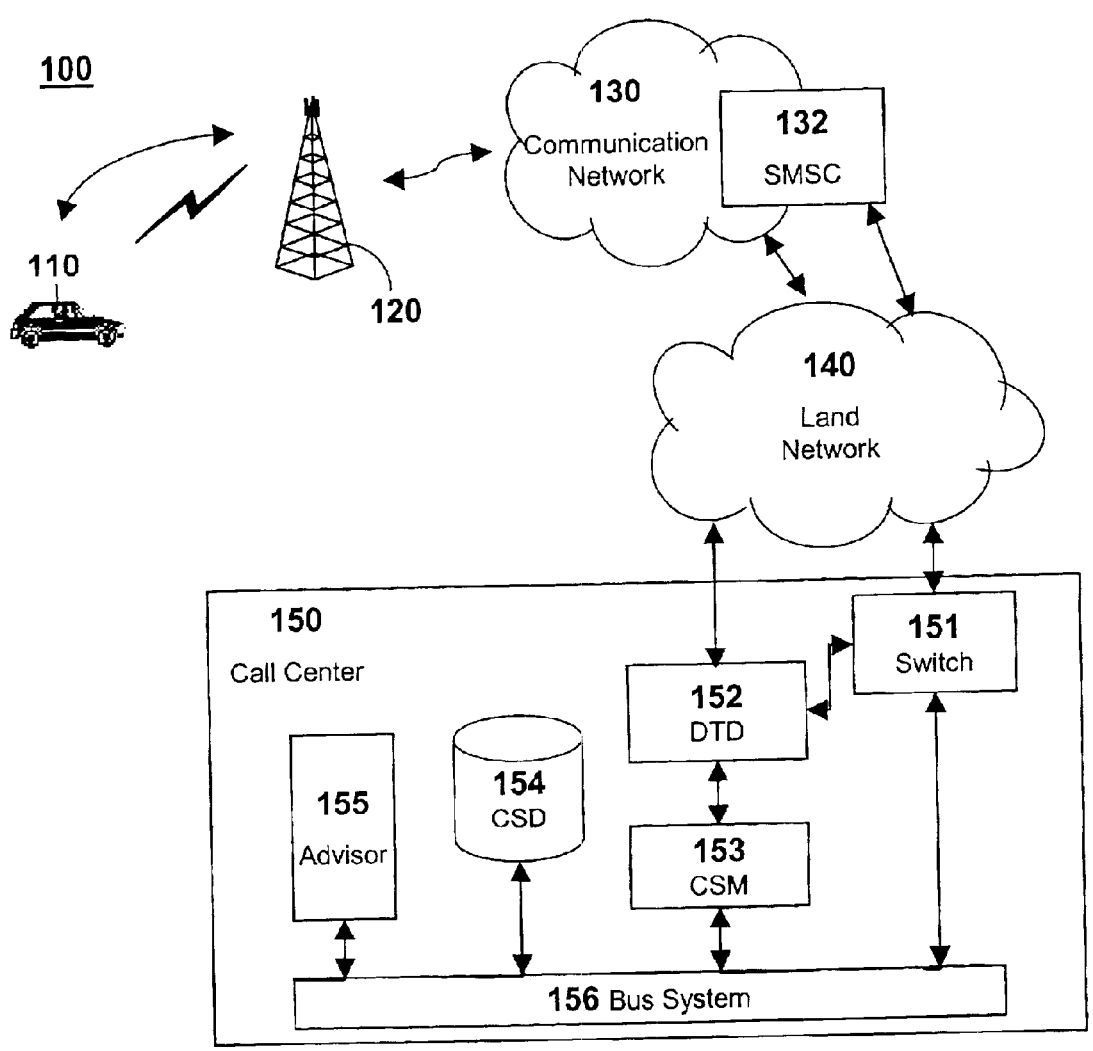
FIG. 1 is an illustration of one embodiment of a system for accessing a quiescent mobile vehicle using a wireless communication system, in accordance with the present invention.

FIG. 1 shows an illustration of one embodiment of a system for accessing a quiescent mobile vehicle using a wireless communication system, in accordance with the present invention at 100.

Mobile vehicle access system 100 may contain one or more mobile vehicles 110, one or more wireless carrier systems 120, one or more communication networks 130, one or more short message service centers (SMSC) 132, one or more land networks 140, and one or more call centers 150. Call center 150 may contain one or more switches 151, one or more data transmission devices (DTD) 152, one or more communication services managers (CSM) 153, one or more communication services databases (CSD) 154, one or more advisors 155, and one or more bus systems 156.

Mobile vehicle 110 may contain a wireless vehicle communication device, such as an analog or digital phone with suitable hardware and software for transmitting and receiving data communications. Mobile vehicle 110 may also contain a wireless modem for transmitting and receiving data. Mobile vehicle 110 may further contain a digital signal processor with software and additional hardware to enable communications with the mobile vehicle and to perform other routines and requested services. Mobile vehicle 110 may contain a global positioning system (GPS) unit capable of determining synchronized time and a geophysical location of the mobile vehicle. Mobile vehicle 110 may send to and receive radio transmissions from wireless carrier system 120.

Wireless carrier system 120 may be a wireless communications carrier. Wireless carrier system 120 may be, for example, a mobile telephone system. The mobile telephone system may be an analog mobile telephone system operating over a prescribed band nominally at 800 MHz. The mobile telephone system may also be a digital mobile telephone system operating over a prescribed band nominally at 800

MHz, 900 MHz, 1900 MHz, or any suitable band capable of carrying mobile communications. Wireless carrier system 120 may transmit to and receive signals from mobile vehicle 110. Wireless carrier system 120 may transmit to and receive signals from a second mobile vehicle 110. Wireless carrier system 120 may be connected with communications network 130.

Communications network 130 may comprise a mobile switching center. Communications network 130 may comprise services from one or more wireless communications companies. Communications network 130 may be any suitable system or collection of systems for connecting wireless carrier system 120 to a second mobile vehicle 110 or to a call center.

Communications network 130 may include one or more short message service centers 132. Short message service center 132 may prescribe alphanumeric short messages to and from mobile vehicles 110. Short message service center 132 may include message entry features, administrative controls, and message transmission capabilities. Short message service center 132 may store and buffer the messages. Short message services may include functional services such as paging, text messaging and message waiting notification. Short message services may include other telematic services such as broadcast services, time-driven message delivery, autonomous message delivery, and database-driven information services. The telematic services may further include message management features, such as message priority levels, service categories, expiration dates, cancellations, and status checks.

Land network 140 may be a public-switched telephone network. Land network 140 may be comprised of a wired network, an optical network, a fiber network, another wireless network, or any combination thereof. Land network 140 may comprise an Internet protocol (IP) network. Land network 140 may connect communications network 130 to a call center.

Land network 140 may connect a first wireless carrier system 120 with a second wireless carrier system 120. Communication network 130 and land network 140 may connect wireless carrier system 120 to a communication node or call center 150.

Call center 150 may be a location where many calls may be received and serviced at the same time, or where many calls may be sent at the same time. The call center may be a telematics call center, prescribing communications to and from mobile vehicles 110. The call center may be a voice call center, providing verbal communications between an advisor in the call center and a subscriber in a mobile vehicle. The call center may contain each of these functions.

The call center may further contain switch 151. Switch 151 may be connected to land network 140, and may receive a modem signal from an analog modem or from a digital modem. Switch 151 may transmit voice or data transmission from the communication node. Switch 151 may also receive voice or data transmissions from mobile vehicle 110 through wireless carrier system 120, communications network 130, and land network 140. Switch 151 may receive from or send data transmissions to data transmission device 152. Switch 151 may receive from or send voice transmissions to advisor 155 via bus system 156.

Data transmission device 152 may send or receive data from switch 151. Data transmission device 152 may be an IP router or a modem. Data transmission device 152 may transfer data to or from advisor 155, one or more communication services managers 153, one or more communication services databases 154, and any other device connected to bus system 156. Data transmission device 152 may convey information received from short message service center 132 in communication network 130 to communication services manager 153.

Communication services manager 153 may be connected to switch 151, data transmission device 152, and advisor 155 through bus system 156. The call center may contain any combination of hardware or software facilitating data transmissions between call center 150 and mobile vehicle 110.

Communication services manager 153 may receive information from mobile vehicle 110 through wireless carrier system 120, short message service center 132 in communication network 130, land network 140, and data transmission device 152. Communication services manager 153 may send information to mobile vehicle 110 through data transmission device 152, land network 140, communication network 130 and wireless carrier system 120. Communication services manager 153 may send short message service messages via short message service center 132 to the mobile vehicle. Communication services manager 153 may receive short message service replies from mobile vehicle 110 via short message service center 132. Communication services manager 153 may send a short message service request to mobile vehicle 110.

Communication services database 154 may contain records on one or more mobile vehicles 110. A portion of communication services database 154 may be dedicated to short message services. Records in communication services database 154 may include vehicle identification, location information, status information, and recent action information regarding mobile vehicle 110. Communication services database 154 may provide information and other support to communication services manager 153.

Advisor 155 may be a real advisor or a virtual advisor. A real advisor may be, for example, a human being in verbal communication with mobile communication device 110. A virtual advisor may be a synthesized voice interface responding to requests from mobile communication device 110. Advisor 155 may provide services to mobile communication device 110. Advisor 155 may communicate with communication services manager 153 or any other device connected to bus system 156.

Figure 2:
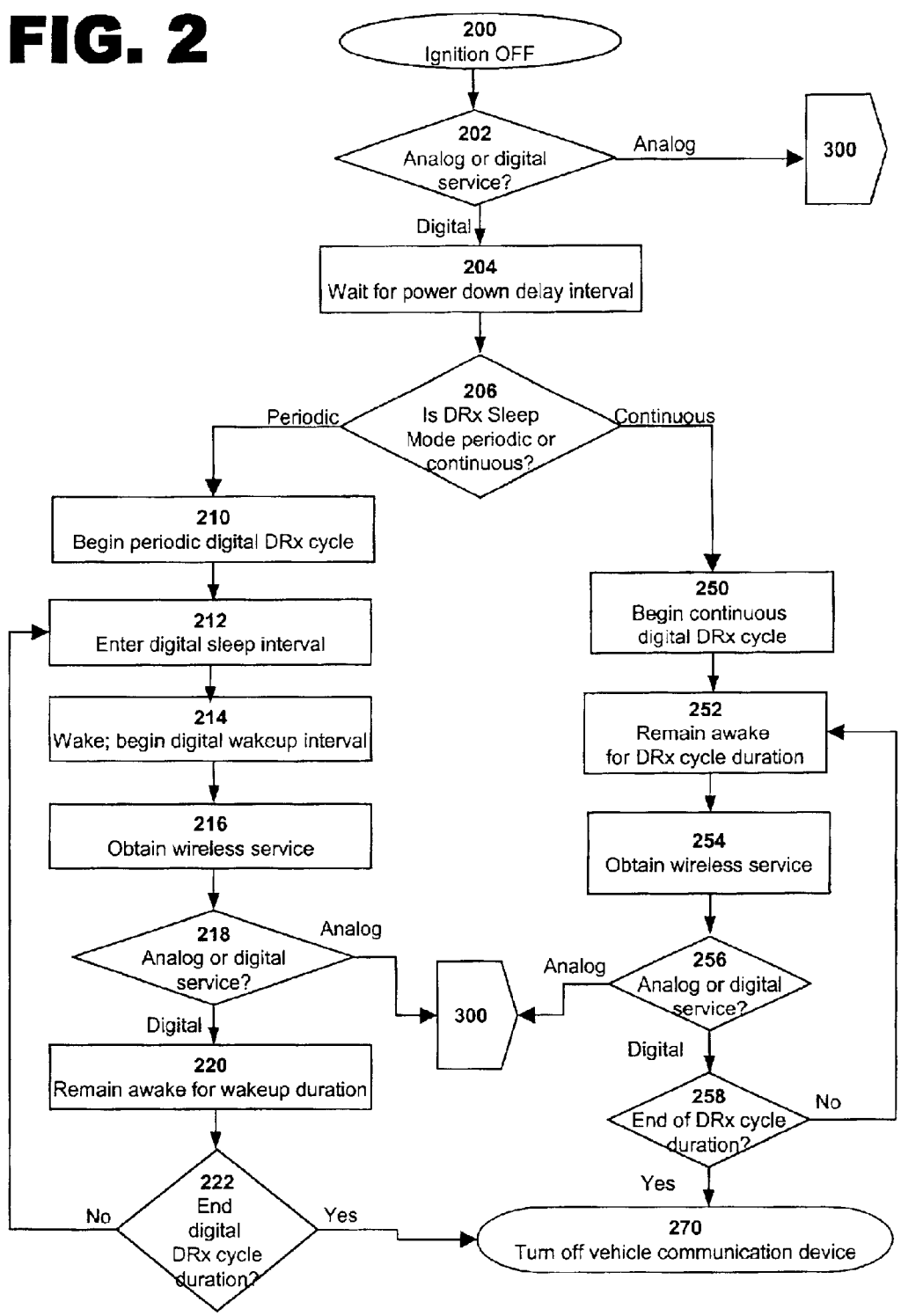
FIG. 2 is a flow diagram of one embodiment of a method for accessing a quiescent mobile vehicle in a mixed communication service environment, in accordance with the present invention.

FIG. 2 shows one embodiment of a method for accessing a quiescent mobile vehicle in a mixed communication service environment, in accordance with the present invention at 200. The method of FIG. 2 may be used, for example, if digital communication service is available to the vehicle in order to achieve a digital DRx mode. In some embodiments of the invention, one or more communication services are made available to mobile vehicle 110 via a wireless vehicle communication device, such as an analog or digital phone with suitable hardware and software for transmitting and receiving data communications. Mobile vehicle 110 may also contain a wireless modem for transmitting and receiving data. Mobile vehicle 110 may further contain a digital signal processor with software and additional hardware to enable communications with the mobile vehicle and to perform other routines and requested services. Mobile vehicle 110 may contain a global positioning system (GPS) unit capable of determining synchronized time and a geophysical location of the mobile vehicle.

As seen at block 200, the cycle of the present invention may begin as soon as the ignition of the vehicle is turned off. In alternate embodiments of the invention, although the ignition of the vehicle is off, the vehicle communication device is not yet powered off.

As seen at block 202, it may first be determined if a digital or analog communication service is available to vehicle 110 at the time the ignition is turned off. For example, digital or analog communication service may be made available via a vehicle communication device. If only analog service is available, the routine proceeds to block 300 as further described below.

If, as seen at block 204, digital service is available, then a power down delay interval may be allowed to elapse before the vehicle communication device actually powers down. The value of the power down delay interval may be any suitable time value such as, for example, ten minutes or one hour. This power down delay interval may be a predetermined amount of time before the vehicle communication device powers down. The power down delay interval may allow a subscriber to use the vehicle communication device immediately after the vehicle's ignition is off. One such instance may occur, for example, if a subscriber locks his keys in the car and would like to use a telematics device to unlock the car. The power down delay interval allows delivery of telematics services for a time period immediately after the ignition has been turned off so that the subscriber does not have to wait through a sleep interval before a wakeup interval begins.

The value of the power down delay interval may be determined using any suitable means known in the art. For example, the power down delay interval may be preset based on the specifications of the mobile vehicle or the specifications of the vehicle communication device (for instance, these values may be preset as the vehicle is assembled). Alternatively, the user of a mobile vehicle or the vehicle's communication device may set the value of the power down delay interval. Alternatively, a suitable algorithm may govern the power down delay interval. One method for determining the value of the power down delay interval is described in co-pending U.S. patent application Ser. No. 10/109,466 entitled "Method and System for Dynamically Determining Sleep Cycle Values in a Quiescent Mobile Vehicle" by Ronald W. Fraser et al.

As seen at block 206, it may be determined if the digital DRx cycle is a periodic or continuous cycle as described above. Although only two digital DRx cycle types are described, periodic and continuous, the type of cycle used by a particular vehicle communication device may be any suitable cycle type. In addition, although this determination is made at block 206 in the embodiment of FIG. 2, the determination may also be made at any suitable time during the routine of FIG. 2. The DRx cycle type may be preset based on the specifications of the mobile vehicle or the vehicle communication device (for instance, the type may be preset as the vehicle is assembled). Alternatively, the user of a mobile vehicle or the vehicle's communication device may set the type of cycle. For example, a user may set the cycle to a continuous DRx cycle if he will only be away from his vehicle for a short period of time but may choose a periodic cycle if he will be away from the vehicle for a longer period of time.

In one embodiment of the invention, the DRx cycle is a periodic cycle. As seen at block 210, once the power down delay interval has elapsed, the vehicle communication device of vehicle 110 may enter a periodic digital DRx cycle, which may last for a DRx cycle duration. This periodic digital DRx cycle is a cycle during which the vehicle communication device is capable of being awakened in order to provide services but also occasionally enters a sleep state in order to conserve power. The value of the digital DRx cycle duration may be any suitable time value.

For example, in one embodiment of the invention, the digital DRx cycle duration may be two days. This digital DRx cycle duration may be a predetermined amount of time before the vehicle communication device completely powers down.

The digital DRx cycle may comprise a wakeup interval that has a specific duration (wakeup duration) and a sleep interval that also has its own duration (sleep duration). The vehicle communication device is enabled to receive communication service during the wakeup interval and is not enabled to receive communication service during the sleep interval. The periodic digital DRx cycle may consist of several cycles of wakeup and sleep intervals, after which the vehicle communication device powers down.

As seen at block 212, in one embodiment of the invention, the vehicle may enter a sleep interval of the periodic digital DRx cycle. The value of the digital sleep duration may be determined using any suitable means known in the art. For example, the digital sleep duration may be preset based on the specifications of the mobile vehicle or the vehicle communication device (for instance, these values may be preset as the vehicle is assembled). Alternatively, the user of a mobile vehicle or the vehicle's communication device may set the value of the digital sleep duration. Alternatively, a suitable algorithm may govern the digital sleep duration. One method for determining the value of the digital sleep duration is described in co-pending U.S. patent application Ser. No. 10/109,466 to Applicant.

As seen at block 214, once the vehicle communication device wakes, the digital wakeup interval begins and lasts for a given wakeup duration. The vehicle communication device may be enabled to receive communication service for the wakeup duration of the digital wakeup interval. The value of the wakeup duration may be any suitable time value. For example, in one embodiment of the invention, the wakeup duration may be one day. Alternatively, the wakeup duration may be any value from 1 to 10 minutes, from 3 to 7 minutes or from 4 to 6 minutes. This wakeup duration may be a predetermined amount of time, during the digital DRx cycle, before the vehicle communication device enters a sleep interval. Alternatively, the wakeup duration may be a predetermined amount of time after which the vehicle communication device completely powers down.

The value of the digital wakeup duration may be determined using any suitable means known in the art. For example, the wakeup duration may be based on the length of the DRx cycle (e.g., the duration of DRx cycle is set to two days so the wakeup duration is a fraction of the 48 hour periods such as one-half, which is 24 hours, or one-one-hundredth, which is 28 minutes.) The wakeup duration may be preset based on the specifications of the mobile vehicle or the vehicle communication device (for instance, these values may be preset as the vehicle is assembled). Alternatively, the user of a mobile vehicle or the vehicle's communication device may set the value of the wakeup duration. Alternatively, a suitable algorithm may govern the wakeup duration. One method for determining the value of the digital wakeup duration is described in co-pending U.S. patent application Ser. No. 10/109,466 to Applicant.

As seen at block 216, while the vehicle communication device is awake during the duration of the digital wakeup interval, vehicle 110 may obtain one or more communication services as described above. The digital wakeup interval may allow a subscriber to use the vehicle communication device even after the vehicle's ignition is off. The digital wakeup interval allows delivery of telematics services even though the vehicle is powered down. One such instance may be if a subscriber locks his keys in the car and would like to use telematics to unlock the car. In the embodiment shown in FIG. 2, vehicle 110 or its vehicle communication device may obtain, for example, a wireless service.

As seen at block 218, while the vehicle communication device is awake during the duration of the wakeup interval, the communication service obtained at block 210 may be evaluated to determine if the available communication service is analog or digital. If only analog service is available, the routine proceeds to block 300 as further described below.

If, as seen at block 220, digital service is available, the vehicle communication device may continue to remain awake for the duration of the digital wakeup interval, allowing a subscriber to use the vehicle communication device for this duration. The subscriber may use the vehicle communication device to obtain any communication service as described above.

Once the digital awake duration has elapsed, as seen at block 222, it may be determined whether the periodic DRx cycle duration has elapsed. If the periodic DRx cycle duration has not yet elapsed, the vehicle communication device may return to block 212 and begin a next digital sleep interval.

As described above, the value of the next digital sleep duration may be any suitable time value. The value of the next digital sleep duration may be the same as, or different, than the digital sleep duration originally entered at block 212. For example, in one embodiment of the invention, the sleep duration may be one day. Alternatively, the sleep duration may be any value from 1 to 10 minutes, from 3 to 7 minutes or from 4 to 6 minutes. This digital sleep duration may be a predetermined amount of time, during the periodic DRx cycle, when the vehicle communication device is powered down to improve current drain.

The value of the digital sleep duration may be determined using any suitable means known in the art. For example, the digital sleep duration may be based on the length of the DRx cycle (e.g., the duration of the digital DRx cycle is set to two days so the sleep duration is a fraction of the 48 hour period such as one-half, which is 24 hours, or one-one-hundredth, which is 28 minutes). The digital sleep duration may also be based on the length of the digital wakeup duration (e.g., the digital wakeup duration is set to 5 minutes so the digital sleep duration is a multiple of the 5 minute period such as 2 times, which is 10 minutes). The digital sleep duration may be preset based on the specifications of the mobile vehicle or the vehicle communication device (for instance, these values may be preset as the vehicle is assembled). Alternatively, the user of a mobile vehicle or the vehicle's communication device may set the value of the digital sleep duration. Alternatively, a suitable algorithm may govern the sleep duration. One method for determining the value of the digital sleep duration is described in co-pending U.S. patent application Ser. No. 10/109,466 to Applicant.

From block 212, the routine of FIG. 2 may proceed to blocks 214, 216, etc. as described above until the periodic DRx cycle duration has ended.

Alternatively, if at block 222, it is determined that the periodic DRx cycle duration has ended, the vehicle communication device may be powered down as shown at block 270.

In another embodiment of the invention as seen in FIG. 2, the DRx cycle is a continuous cycle. As seen at block 250, once the power down delay interval has elapsed, the vehicle communication device of vehicle 110 may enter a continuous digital DRx cycle, which may last for a DRx cycle duration. This continuous digital DRx cycle is a cycle during which the vehicle communication device is remains awake in order to provide services until the DRx cycle is over. The value of the continuous digital DRx cycle duration may be any suitable time value. For example, in one embodiment of the invention, the digital DRx cycle duration may be two days. This digital DRx cycle duration may be a predetermined amount of time before the vehicle communication device completely powers down.

As seen at block 252, in one embodiment of the invention, the vehicle remains awake for the entire duration of the continuous digital DRx cycle. The value of the continuous digital DRx cycle duration may be determined using any suitable means known in the art. For example, the continuous digital DRx cycle duration may be preset based on the specifications of the mobile vehicle or the vehicle communication device (for instance, these values may be preset as the vehicle is assembled). Alternatively, the user of a mobile vehicle or the vehicle's communication device may set the value of the continuous digital DRx cycle duration. Alternatively, a suitable algorithm may govern the continuous digital DRx cycle duration.

As seen at block 254, while the vehicle communication device is awake during the duration of the continuous digital DRx cycle, vehicle 110 may obtain one or more communication services as described above. The continuous digital DRx cycle may allow a subscriber to use the vehicle communication device even after the vehicle's ignition is off.

As seen at block 256, while the vehicle communication device is awake during the continuous digital DRx cycle, the communication service obtained at block 254 may be evaluated to determine if the available communication service is analog or digital. If only analog service is available, the routine proceeds to block 300 as further described below.

A seen at block 258, it may be determined whether the continuous DRx cycle duration has elapsed. If the continuous DRx cycle duration has not yet elapsed, the vehicle communication device may return to block 252, remaining awake for the duration of the continuous DRx cycle duration.

As seen at block 270, once the continuous DRx cycle duration has elapsed, the continuous digital DRx cycle ends and the vehicle communication device may be powered down.

Figure 3:
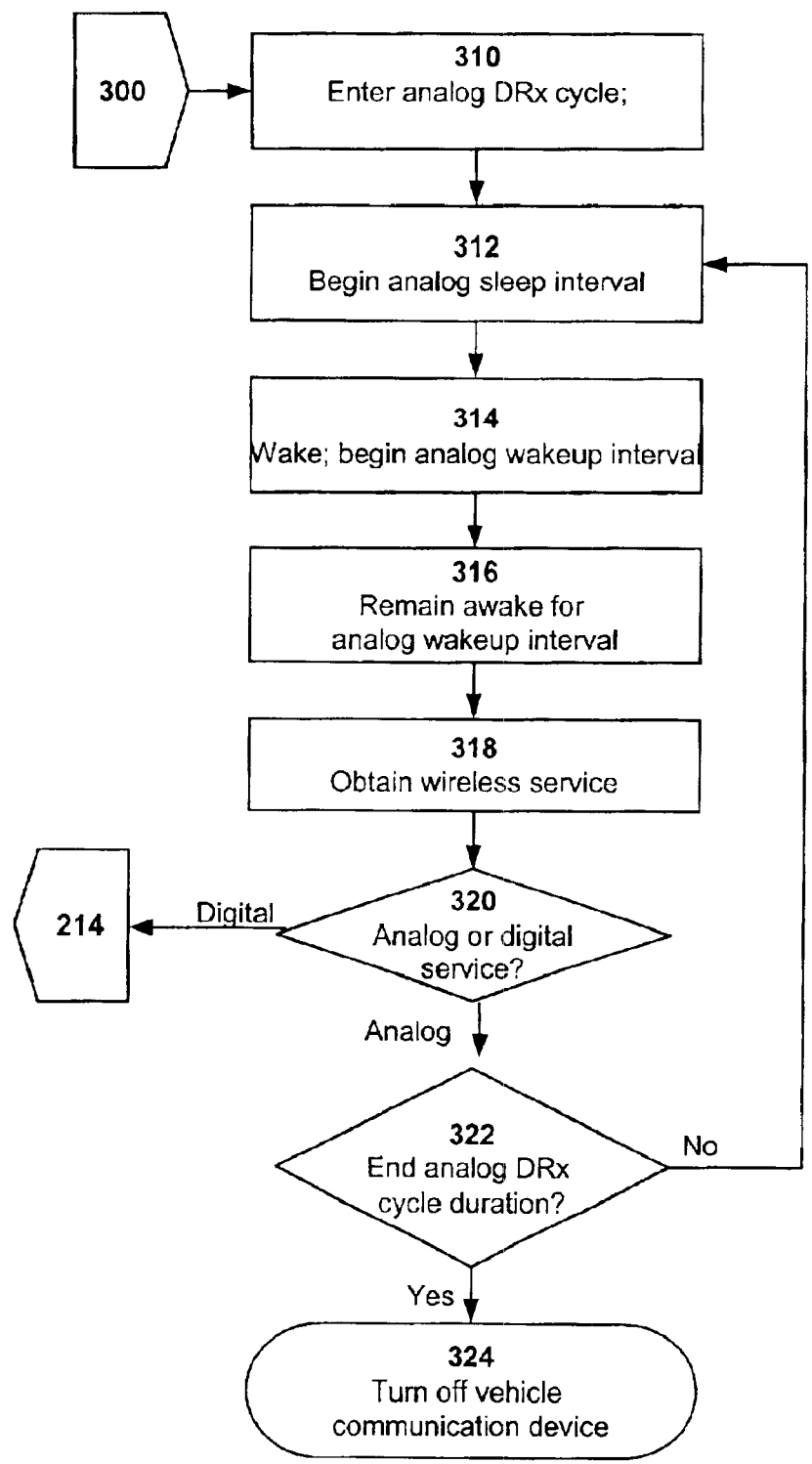
FIG. 3 is a flow diagram of a subroutine of the method for accessing a quiescent mobile vehicle in a mixed communication service environment shown in FIG. 2.

FIG. 3 shows one embodiment of a subroutine of a method for accessing a quiescent mobile vehicle in a mixed communication service environment in accordance with the present invention at 300. The method of FIG. 3 may be used, for example, if digital service is not available to the vehicle for achieving DRx mode and analog service is used.

If, as seen at block 300, only analog service is available, the vehicle communication device of vehicle 110 may enter an analog DRx cycle, which will last for an analog DRx cycle duration. The value of the analog DRx cycle duration may be any suitable time value. For example, in one embodiment of the invention, the analog DRx cycle duration may be two days. This analog cycle DRx duration may be a predetermined amount of time before the vehicle communication device completely powers down.

This analog cycle may comprise an analog wakeup interval that has a specific duration (analog wakeup duration) and an analog sleep interval that also has its own duration (analog sleep duration). The vehicle communication device is enabled to receive communication service during the analog wakeup interval and is not enabled to receive communication service during the analog sleep interval.

The value of the analog DRx cycle duration may be determined using any suitable means known in the art. For example, the analog cycle duration may be preset based on the specifications of the mobile vehicle or the vehicle communication device (for instance, these values may be preset as the vehicle is assembled). Alternatively, the user of a mobile vehicle or the vehicle's communication device may set the value of the analog DRx cycle duration. Alternatively, a suitable algorithm may govern the analog DRx cycle duration.

As seen at block 312, in one embodiment of the invention, the vehicle enters the analog DRx cycle by entering an analog sleep interval of the analog DRx cycle. The value of the analog sleep duration may be determined using any suitable means known in the art. For example, the analog sleep duration may be preset based on the specifications of the mobile vehicle or the vehicle communication device (for instance, these values may be preset as the vehicle is assembled). Alternatively, the user of a mobile vehicle or the vehicle's communication device may set the value of the analog sleep duration. Alternatively, a suitable algorithm may govern the analog sleep duration.

As seen at block 314, vehicle 110 and/or its vehicle communication device may enter an analog wakeup interval once the analog sleep duration has elapsed. Once the vehicle communication device wakes, the analog wakeup interval begins and lasts for a given wakeup duration. As seen at block 316, the vehicle communication device may remain awake for the duration of the analog wakeup interval. The vehicle communication device may be enabled to receive communication service for the duration of the analog wakeup interval.

The value of the analog wakeup duration may be any suitable time value. For example, in one embodiment of the invention, the analog wakeup duration may be one day. Alternatively, the analog wakeup duration may be any value from 1 to 10 minutes, from 3 to 7 minutes or from 4 to 6 minutes. This wakeup duration may be a predetermined amount of time, during the analog cycle, before the vehicle communication device enters an analog sleep interval.

The value of the analog wakeup duration may be determined using any suitable means known in the art. For example, the analog wakeup duration may be based on the length of the analog cycle (e.g., the duration of analog cycle is set to two days so the wakeup duration is a fraction of the 48 hour period.) The analog wakeup duration may be preset based on the specifications of the mobile vehicle or the vehicle communication device (for instance, these values may be preset as the vehicle is assembled). Alternatively, the user of a mobile vehicle or the vehicle's communication device may set the value of the analog wakeup duration. Alternatively, a suitable algorithm may govern the analog wakeup duration.

As seen at block 318, while the vehicle communication device is awake during the duration of the analog wakeup interval, vehicle 110 may attempt to obtain a communication service as described above. For example, vehicle 110 may attempt to obtain digital service again. The analog wakeup interval may allow a subscriber to use the vehicle communication device even after the vehicle's ignition is off.

As seen at block 320, while the vehicle communication device is awake during the duration of the wakeup interval, the communication service obtained at block 318 may be evaluated to determine if the available communication service is analog or digital. If digital service has now been obtained, the vehicle communication device may return to the digital service routine of the present invention as indicated at block 214 of FIG. 3. If only analog service is available, the routine may continue to block 322 as further described below.

As seen at block 322, once the duration of the analog wakeup interval has elapsed, it may be determined whether the analog DRx cycle duration has elapsed. If the analog DRx cycle duration has not yet elapsed, the vehicle communication device may return to block 312 and begin a new sleep interval.

Alternatively, if at block 322, it is determined the analog DRx cycle duration has ended; the vehicle communication device may be powered down as shown at block 324.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method accessing a mobile vehicle using a wireless communication system, comprising:

placing a vehicle communication device into a first communication service sleep mode of a sleep cycle, determining if a first communication service is currently available to the vehicle communication device, if the first communication service is available, remaining in a first communication service awake mode for a first interval of the sleep cycle, and if the first communication service is not available, remaining in the first communication service sleep mode for the first interval of the sleep cycle.

2. The method of claim 1, further comprising:

determining if a second communication service is currently available to the vehicle communication device; and selecting the second communication service.

3. The method of claim 2, further comprising:

re-determining if the first communication service is available; and if the first communication service is not available, remaining in a second communication service awake mode for a second interval of the sleep cycle.

4. The method of claim 3, further comprising:

returning to the first communication service sleep mode after the first interval of the sleep cycle has elapsed.

5. The method of claim 4, further comprising:

determining if the sleep cycle is ended, and if the sleep cycle is ended, turning the vehicle communication device off.

6. The method of claim 2 wherein the second communication service an analog service.

7. The method of claim 1, further comprising:

determining if the first interval of the sleep cycle is a continuous interval.

8. The method of claim 7, wherein the first interval of the sleep cycle is continuous, further comprising:

remaining in the first communication service awake mode until the sleep cycle is ended.

9. The method of claim 8, further comprising:

turning the vehicle communication device off once the sleep cycle is ended.

10. The method of claim 7, wherein the first interval is not continuous, further comprising:

returning to the first communication service sleep mode after the first interval of the sleep cycle has elapsed.

11. The method of claim 10, further comprising:

determining if the sleep cycle is ended; and if the sleep cycle is ended, turning the vehicle communication device off.

12. The method of claim 1 wherein the first communication service is digital service.

13. Computer program product in a computer usable medium for accessing a mobile vehicle using a wireless communication system, comprising:

means far placing a vehicle communication device into a first communication service sleep mode of a sleep cycle;

means for determining if a first communication service is currently available to the vehicle communication device;

if the first communication service is available, means for remaining in a first communication service awake mode for a first interval of the sleep cycle; and if the first communication service is not available, means for remaining in the first communication service sleep mode for the first interval of the sleep cycle.

14. The product of claim 13, further comprising:

means for determining if a second communication service is currently available to the vehicle communication device; and means for selecting the second communication service.

15. The product of claim 14, further comprising:

means for re-determining if the first communication service is available; and if the first communication service is not available, means for remaining in a second communication service awake mode for a second interval of the sleep cycle.

16. The product of claim 15, further comprising:

means for returning to the first communication service sleep mode after the first interval of the sleep cycle has elapsed.

17. The product of claim 16, further comprising:

means for determining if the sleep cycle is ended; and if the sleep cycle is ended, means for turning the vehicle communication device off.

18. The product of claim 13, further comprising:

means for determining if the first interval of the sleep cycle is a continuous interval.

19. The product of claim 18, wherein the first interval of the sleep cycle is continuous, further comprising:

means for remaining in the first communication service awake mode until the sleep cycle is ended.

20. The product of claim 18, wherein the first interval is not continuous, further comprising:

means for returning to the first communication service sleep mode after the first interval of the sleep cycle has elapsed.

21. A mobile vehicle access system, comprising:

means for placing a vehicle communication device into a first communication service sleep mode of a sleep cycle;

means for determining if a first communication service is currently available to the vehicle communication device;

if the first communication service is available, means for remaining in a first communication service awake mode for a first interval of the sleep cycle; and if the first communication service is not available, means for remaining in the first communication service sleep mode for the first interval of the sleep cycle.

22. The system of claim 21, further comprising:

means for determining if a second communication service is currently available to the vehicle communication device; and means for selecting the second communication service.

23. The system of claim 22, further comprising:

means for re-determining if the first communication service is available; and if the first communication service is not available, means for remaining in a second communication service awake mode for a second interval of the sleep cycle.

24. The system of claim 23, further comprising:

means for returning to the first communication service sleep mode after the first interval of the sleep cycle has elapsed.

25. The system of claim 24, further comprising:

means for determining if the sleep cycle is ended; and if the sleep cycle is ended, means for turning the vehicle communication device off.

26. The system of claim 21, further comprising:

means for determining if the first interval of the sleep cycle is a continuous interval.

27. The system of claim 26, wherein the first interval of the sleep cycle is continuous, further comprising:

means for remaining in the first communication service awake mode until the sleep cycle is ended.

28. The system of claim 26, wherein the first interval is not continuous, further comprising:

means for returning to the first communication service sleep mode after the first interval of the sleep cycle has elapsed.

* * * * *